(12) United States Patent
Ikeda

(10) Patent No.: US 8,908,323 B2
(45) Date of Patent: Dec. 9, 2014

(54) ROTATING DEVICE

(71) Applicant: Samsung Electro-Mechanics Japan Advanced Technology Co., Ltd., Shizuoka (JP)

(72) Inventor: Takashi Ikeda, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 0 days.

(21) Appl. No.: 14/249,906

(22) Filed: Apr. 10, 2014

(65) Prior Publication Data

US 2014/0307347 A1 Oct. 16, 2014

(30) Foreign Application Priority Data

Apr. 12, 2013 (JP) ................................. 2013-084220

(51) Int. Cl.
*G11B 19/20* (2006.01)
(52) U.S. Cl.
CPC ................................. *G11B 19/2045* (2013.01)
USPC ...................................................... 360/99.08
(58) Field of Classification Search
CPC .... G11B 19/20; G11B 19/2009; G11B 17/02; G11B 17/028; G11B 17/0284; G11B 33/14; G11B 33/1473
USPC ...................... 360/99.08, 99.12, 99.06, 99.16
See application file for complete search history.

(56) References Cited

U.S. PATENT DOCUMENTS

| | | | |
|---|---|---|---|
| 2005/0225187 A1 | 10/2005 | Hafen et al. | |
| 2007/0253102 A1* | 11/2007 | Abdul Hameed | .......... 360/99.08 |
| 2010/0210366 A1* | 8/2010 | Droll et al. | ................. 464/68.41 |
| 2014/0147065 A1* | 5/2014 | Sugiki | ........................... 384/107 |

FOREIGN PATENT DOCUMENTS

JP 2012184800 A 9/2012

* cited by examiner

*Primary Examiner* — Allen T Cao
(74) *Attorney, Agent, or Firm* — Blank Rome LLP

(57) ABSTRACT

A rotating device comprises: a hub on which magnetic recording disks are to be mounted; a shaft which extends along a rotational axis of the hub; a shaft surrounding member which surrounds one end of the shaft so as to rotatably support the shaft; and a base which fixedly supports the shaft surrounding member. A lubricant agent is interposed between the shaft and the shaft surrounding member. A radial gap between the shaft and the shaft surrounding member includes radial dynamic pressure generating portions which generate a dynamic pressure applied to the lubricant agent in a radial direction when the shaft is rotated with respect to the shaft surrounding member. A hub fixation screw hole is provided to the other end face of the shaft along the rotational axis. The hub is fixed to the shaft by coupling a hub fixation screw with the hub fixation screw hole.

20 Claims, 6 Drawing Sheets

100

100

40

ROTATING DEVICE

REFERENCE TO RELATED APPLICATIONS

The present application claims the benefit of JP 2013-084220, filed Apr. 12, 2013, whose disclosure is hereby incorporated by reference in its entirety into the present disclosure.

BACKGROUND OF THE INVENTION

1. Field of the Invention

The present invention relates to a rotating device which rotationally drives a magnetic recording disk.

2. Description of the Related Art

As an example of a rotating device, disk drive apparatuses such as hard disk drives are known. Progress is being made in reducing the size and increasing the data capacity of a disk drive apparatus. Specifically, 3.5-inch hard disk drives having a data capacity on the order of 4.0 TB have become available. Previously, such a hard disk drive apparatus has mainly been mounted in a desktop personal computer. However, such progress in hard disk drives has led to a trend of various kinds of electronic devices such as laptop PCs, recording devices, etc., mounting such a disk drive apparatus. As a conventional technique, a disk drive device has been proposed as described in Japanese Patent Application Laid Open No. 2012-184800, for example. The rise in popularity of large-volume content such as High-Definition video images has led to a demand for such a disk drive apparatus having a further increased data capacity.

SUMMARY OF THE INVENTION

As a method for making progress in increasing the data capacity of such a disk drive apparatus, a method is conceivable in which the number of magnetic recording disks mounted on such a disk drive apparatus is increased. However, typically, an increase in the number of magnetic recording disks mounted on the disk drive apparatus, i.e., an increase in the overall weight of the rotor including the magnetic recording disks, leads to an increase in the force applied to a connection portion that connects a hub and a shaft. With such an arrangement, if the connection portion is not configured with a sufficiently high strength, in some cases, this leads to deformation of the connection portion, resulting in the collapse of the balance of the hub in the rotating operation. This can lead to degradation of data read/write error rate.

In order to improve the connection strength of the connection portion so as to maintain the balance of the hub, a method is conceivable in which the connection portion is configured to have a size increased in the axial direction. However, such an increase in the size of the connection portion in the axial direction leads to a reduction in the bearing span, which is a tradeoff problem. In many cases, this leads to it becoming easier for the hub balance to collapse. Thus, such a method is not preferably employed. That is to say, there has been no known simple method for increasing the number of magnetic recording disks mounted on such a disk drive apparatus.

Such a problem is not restricted to a disk drive apparatus. Rather, such a problem can occur in various other kinds of rotating apparatuses.

The present invention has been made in view of such a situation. Accordingly, it is a general purpose of the present invention to provide a rotating apparatus which is capable of mounting an increased number of magnetic recording disks while maintaining a sufficient hub balance state.

A rotating device according to an embodiment of the present invention comprises: a hub on which a magnetic recording disk is to be mounted; a shaft configured to extend along a rotational axis of the hub; a shaft surrounding member configured to surround one end side of the shaft, and configured to rotatably support the shaft; and a base configured to fixedly support the shaft surrounding member. A lubricant agent is interposed between the shaft and the shaft surrounding member. The gap between the shaft and the shaft surrounding member includes a radial dynamic pressure generating portion configured to generate a dynamic pressure applied to the lubricant agent in a radial direction when the shaft is rotated with respect to the shaft surrounding member. A fastener hole is provided to the other end face of the shaft along the rotational axis. The hub is fixed to the shaft by coupling a fastener with the fastener hole.

Another embodiment of the present invention also relates to a rotating device. The rotating device has a configuration in which a shaft of the rotor side is surrounded by a surrounding member of the stator side via a lubricant agent. The gap between the rotor and the stator includes a tapered sealing portion having a gas-liquid interface of the lubricant agent. The gap between the rotor and the stator is configured as a space which extends in a direction in which the shaft extends. The gap between the rotor and the stator includes two radial dynamic pressure generating portions configured to generate a dynamic pressure applied to the lubricant agent in the radial direction when the rotor is rotated with respect to the stator. The rotor and the stator are configured such that, of the two radial dynamic pressure generating portions, one radial dynamic pressure generating portion and the tapered sealing portion at least partially overlap each other in the axial direction. Furthermore, the rotor and the stator are configured such that the center of gravity of the rotor is positioned between the two radial dynamic pressure generating portions when multiple magnetic recording disks are mounted on the rotor.

Optional combinations of the aforementioned constituting elements and implementations of the invention in the form of methods, apparatuses, or systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1A:
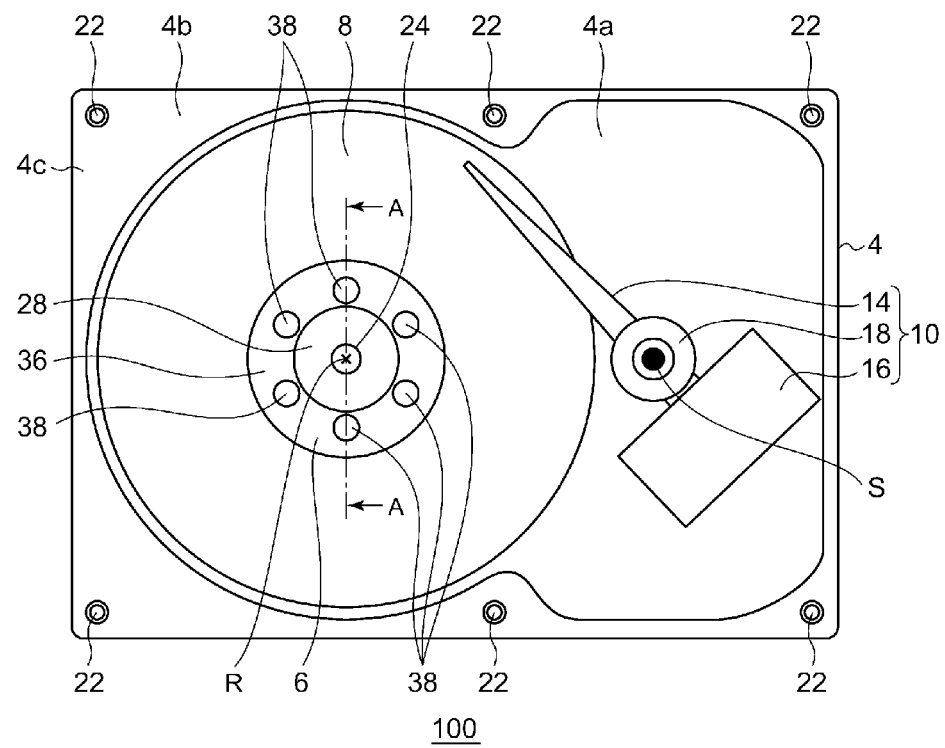
FIG. 1A and FIG. 1B are a top view and a side view showing a rotating device according to an embodiment.

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

The same or similar components, members, and processes described below with reference to the drawings are denoted by the same reference numerals, and redundant description thereof will be omitted as appropriate. It should be noted that the scale of the components shown in the drawings is expanded or reduced as appropriate for ease of understanding. Also, a part of the components that are not essential for describing the embodiment are not shown in the drawings.

A rotating device according to an embodiment is preferably employed as a disk drive apparatus, and particularly as a hard disk drive which mounts a magnetic recording disk and which rotationally drives the magnetic recording disk thus mounted.

Description will be made below regarding the outline of the rotating device according to the present embodiment.

The rotating device according to the present embodiment has a configuration in which a fastener hole is provided along the rotational axis to a shaft that extends with the rotational axis of the hub as its center axis. The hub is fixed to the shaft by means of a fastener engaged with the fastener hole. With such an arrangement, the hub and the shaft are connected to each other with a sufficient strength without increasing the connection portion that connects the hub and the shaft.

Figure 1B:
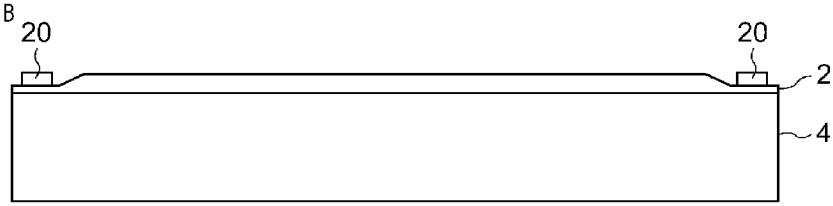

FIGS. 1A and 1B each show a rotating device 100 according to an embodiment. FIG. 1A is a top view of the rotating device 100. FIG. 1B is a side view of the rotating device 100. In order to show the internal structure of the rotating device 100, FIG. 1A shows a state without a top cover 2. The rotating device 100 includes a stator, a rotor which rotates with respect to the stator, a magnetic recording disk 8 mounted on the rotor, and a data read/write unit 10. The stator includes a base 4, a top cover 2, and six screws 20. The rotor includes a hub 28, a hub fixation screw 24, a clamper 36, and six clamp screws 38.

Hereinafter, it is assumed that the side of the base 4 on which the hub 28 is mounted is the "upper" side.

The magnetic recording disk 8 is configured as a 3.5-inch magnetic recording disk formed of an aluminum disk having a diameter of approximately 95 mm, which has a central hole having a diameter of approximately 25 mm, and which has a thickness of approximately 1.27 mm or approximately 1.75 mm. Each magnetic recording disk 8 is mounted on the hub 28, and is rotated according to the rotation of the hub 28. With the present embodiment, four magnetic recording disks 8 are mounted on the hub 28, as described later with reference to FIG. 2.

The base 4 is formed by molding an aluminum alloy material by means of die casting. The base 4 includes a bottom portion 4a that defines the bottom of the rotating device 100, and an outer wall portion 4b formed along the outer edge of the bottom portion 4a so as to surround a mounting region on which the magnetic recording disk 8 is to be mounted. Six screw holes 22 are formed in an upper face 4c of the outer wall portion 4b. Also, the base 4 may be formed by press forming a steel plate or aluminum plate. In this case, the base 4 may be provided with an embossed portion having a structure in which a protrusion is formed on one face of the base 4 by pressing upward, which provides the other face with a recess. By providing such an embossed portion to a predetermined portion of the base 4, such an arrangement is capable of suppressing deformation of the base 4.

In order to prevent the detachment of the surface layer of the base 4, the base 4 is subjected to surface coating. The surface coating may be performed using a resin material such as epoxy resin or the like, for example. Alternatively, the surface coating may be performed by plating the surface of the base 4 with a metal material such as nickel, chrome, or the like. With the present embodiment, the surface of the base 4 is subjected to electroless nickel plating. Such an arrangement allows the surface of the base 4 to have a high hardness and a low friction coefficient, as compared with the surface of the base 4 subjected to resin coating. Furthermore, such an arrangement reduces a risk of damage of the surface of the base 4 or the magnetic recording disk 8 even if the magnetic recording disk 8 comes in contact with the surface of the base 4 in the manufacturing. With the present embodiment, the surface of the base 4 is formed to have a static friction coefficient ranging between 0.1 and 0.6. Such an arrangement further reduces a risk of damage of the base 4 or the magnetic recording disk 8, as compared with the surface of the base 4 having a static friction coefficient of 2 or more.

The data read/write unit 10 includes a record and playback head (not shown), a swing arm 14, a voice coil motor 16, and a pivot assembly 18. The record and playback head is arranged at the end of the swing arm 14, and is configured to record data on the magnetic recording disk 8, and to read out data from the magnetic recording disk 8. The pivot assembly 18 supports the swing arm 14 such that it can be freely swung around the head rotational axis S with respect to the base 4. The voice coil motor 16 swings the swing arm 14 around the head rotational axis S, such that the record and playback head is shifted to a desired position above the face of the magnetic recording disk 8. The voice coil motor 16 and the pivot assembly 18 are each configured using known techniques for controlling the head position.

The top cover 2 is fixedly arranged on the upper face 4c of the outer wall portion 4b of the base 4 using the six screws 20. The six screws 20 respectively correspond to the six screw holes 22. Specifically, the top cover 2 and the upper face 4c of the outer wall portion 4b are fixedly coupled to each other such that no leaks to the interior of the rotating device 100 arise via the connection between them.

Figure 2:
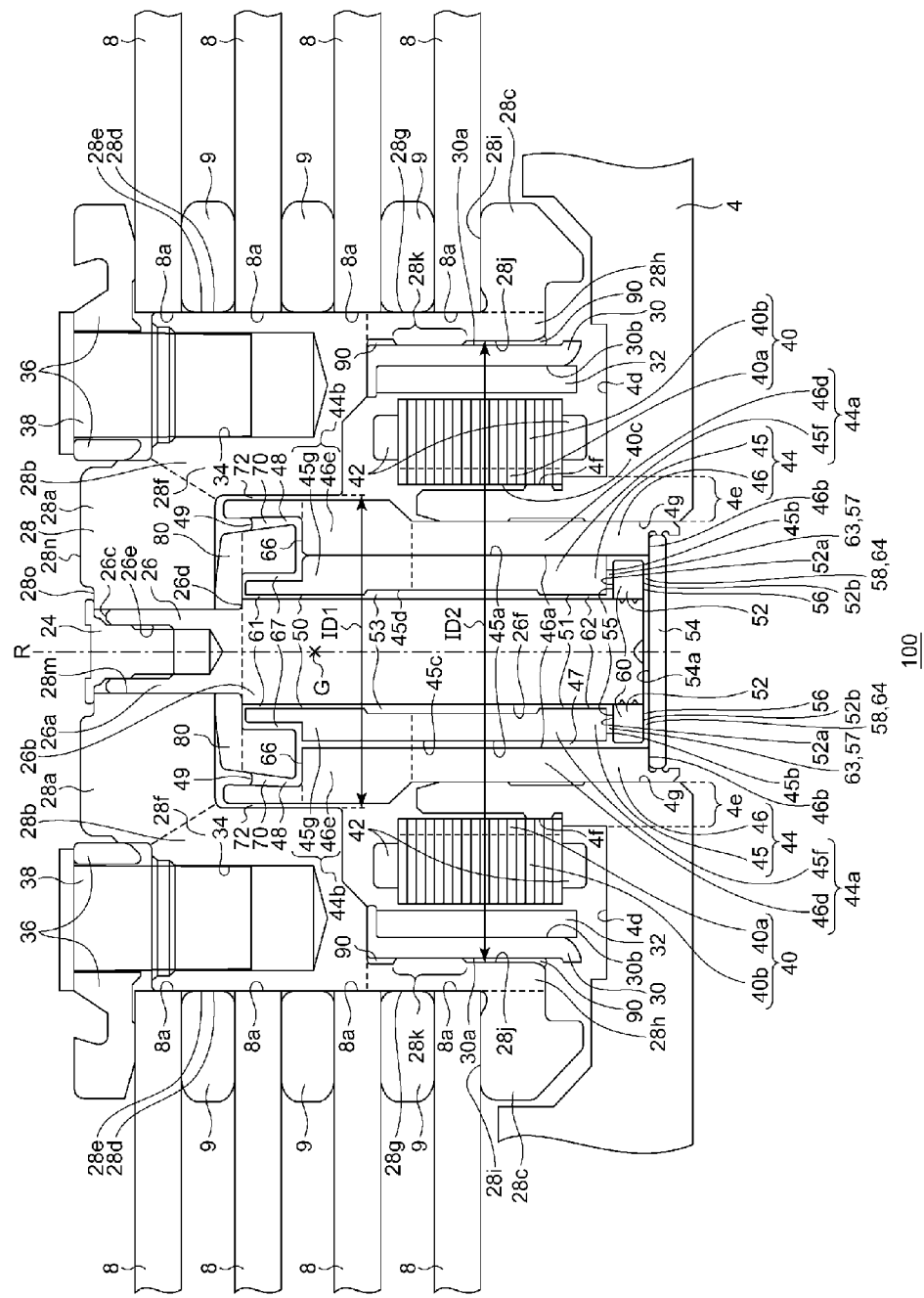
FIG. 2 is a cross-sectional view taken along line A-A.

FIG. 2 is a cross-sectional view taken along line A-A in FIG. 1A.

The rotor further includes a circular member 80, a cylindrical magnet 32, a yoke 30, and a flange 52. The stator further includes a shaft surrounding member 44, a laminated core 40, a coil 42, and a counter plate 54. The lubricant agent 48 is continuously interposed in a part of the gap between the rotor and the stator.

A shaft 26 is configured such that it extends with the rotational axis R of the hub 28 as its center axis. The shaft 26 has a shaft small-diameter portion 26a in its upper portion, and has a shaft large-diameter portion 26b in its lower portion having a larger diameter than that of the shaft small-diameter portion 26a. A hub fixation screw hole 26e, which is not a through-hole, is formed in the upper face 26c of the shaft small-diameter portion 26a along the rotational axis R. A circular flange 52 is press fitted to the lower end of the shaft large-diameter portion 26b.

The shaft 26 is formed by cutting a steel base material such as SUS420J2 or the like, and by sintering and polishing the resulting member. The sintering of the shaft 26 allows the shaft 26, and particularly the hub fixation screw hole 26e, to have a higher hardness than that of the hub fixation screw 24 to be screwed into the hub fixation screw hole 26e. This reduces the risk of the hub fixation screw 24 biting into the shaft, thereby reducing the risk of deformation of the thread groove provided to the hub fixation screw hole 26e.

The hub 28 is formed by cutting a forged aluminum alloy product such as A6061 or the like, for example. The hub 28 is formed to have a predetermined shape, i.e., an approximately cup-shaped form. In order to prevent the detachment of the surface layer of the hub 28, the hub 28 is subjected to surface coating. The surface coating may be performed using a resin material such as epoxy resin or the like, for example. Also, the surface coating may be performed by plating the surface of the hub 28 with a metal material such as nickel, chrome, or the like, for example. Alternatively, the surface coating may be performed by forming an anodized aluminum layer on the surface. With the present embodiment, the surface of the hub 28 is subjected to electroless nickel plating.

The hub 28 includes a shaft fixation portion 28*a* which surrounds the upper end side of the shaft small-diameter portion 26*a*, and which is fixed to the shaft small-diameter portion 26*a*; a disk fitting portion 28*b* which is arranged outward from the shaft fixation portion 28*a* along the radial direction, and which is to be fit to the central hole 8*a* of each magnetic recording disk 8; and a mounting portion 28*c* which is arranged outward from the disk fitting portion 28*b* along the radial direction.

The disk fitting portion 28*b* is configured to have, as its outer face, an outer cylindrical face 28*d* which is to be fit to the central hole 8*a* of each of the four magnetic recording disks 8. The disk fitting portion 28*b* includes: a first hub cylindrical portion 28*f* having an outer face that corresponds to the upper portion 28*e* of the outer cylindrical face 28*d* and having a first inner diameter ID1; and a second hub cylindrical portion 28*h* having an outer face that corresponds to the lower portion 28*g* of the outer cylindrical face 28*d* and having a second inner diameter ID2 which is greater than the first inner diameter ID1.

Each magnetic recording disk 8 is mounted on a disk mounting face 28*i* configured as an upper face of the mounting portion 28*c*. A circular spacer 9 is inserted into a gap between two magnetic recording disks 8 adjacent to each other in the axial direction. The clamper 36 is arranged to press the four magnetic recording disks 8 and the three spacers 9 into contact with the disk mounting face 28*i*, thereby fixing them on the disk mounting face 28*i*. The clamper 36 is fixed to the hub 28 by means of six clamper screws 38.

The yoke 30 has a reversed-L-shaped cross-section. The yoke 30 is formed of a magnetic material such as iron or the like. The yoke 30 is fixed to the inner face 28*j* of the second hub cylindrical portion 28*h* by means of a combination of adhesion and press fitting. A protrusion 28*k* is formed on the inner face 28*j* of the second hub cylindrical portion 28*h*. In the step in which the yoke 30 is press fitted, the yoke 30 is pressed into contact with the protrusion 28*k*. The protrusion 28*k* is configured as a ring-shaped protrusion with the rotational axis R as its center axis. The gap between the inner face 28*j* of the second hub cylindrical portion 28*h* and the outer face 30*a* of the yoke 30 is filled with an adhesive agent 90. This step can be performed by applying a suitable amount of the adhesive agent 90 to the inner face 28*j* of the second hub cylindrical portion 28*h* before the yoke 30 is press fitted to the hub 28.

The cylindrical magnet 32 is fixedly bonded to the inner face 30*b* of the yoke 30. The cylindrical magnet 32 is formed of rare earth magnet materials or ferrite magnet materials, for example. With the present embodiment, the cylindrical magnet 32 is formed of neodymium rare earth magnet materials. The cylindrical magnet 32 is arranged such that it faces twelve salient poles provided to the laminated core 40 in the radial direction. The cylindrical magnet 32 is configured such that eight driving magnetic poles are formed in the circumferential direction (i.e., in a tangential direction of a circle, the center of which being in the rotational axis R and the circle being perpendicular to the rotational axis R). The cylindrical magnet 32 is subjected to anti-corrosion surface processing by means of electro-coating, spray coating, or the like.

Figure 3:
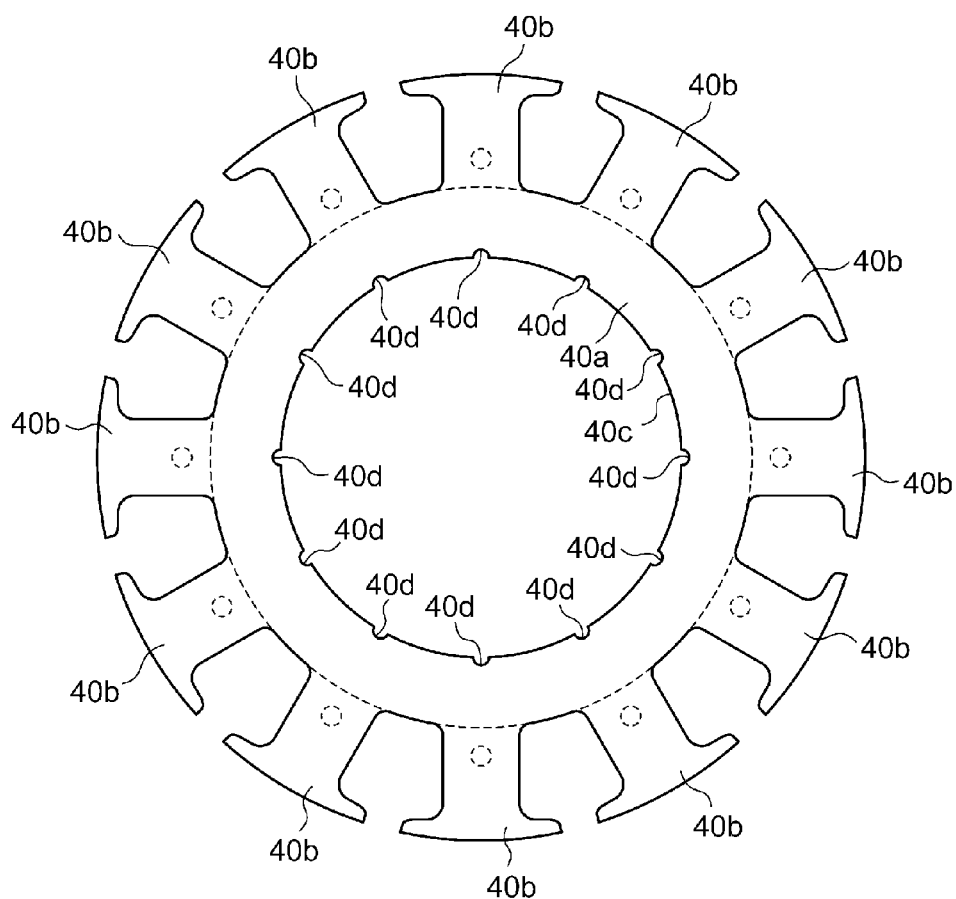
FIG. 3 is a top view of a laminated core.

FIG. 3 is a top view of the laminated core 40. The laminated core 40 has a circular ring portion 40*a* and twelve salient poles 40*b*, each protruding from the circular ring portion 40*a* toward the outer side along the radial direction, and is fixed on the upper face 4*d* side of the base 4. The laminated core 40 is formed by laminating and swaging eighteen thin magnetic steel sheets each having a thickness of 0.35 mm, so as to form a single member. Electrical insulating coating is applied to the surface of the laminated core 40 by means of electro-coating, powder coating, or the like. A coil 42 is wound around each salient pole 40*b* of the laminated core 40. By applying a three-phase driving current having an approximately sinusoidal waveform to the coil 42, such an arrangement is capable of generating a driving magnetic flux along each salient pole 40*b* of the laminated core 40.

Grooves 40*d* are each formed in a straight-line form in the inner face 40*c* of the circular ring portion 40*a* at a position such that they correspond to the respective salient poles 40*b*. Each groove 40*d* is formed in the form of a recessed portion that passes through the overall length of the circular ring portion 40*a* along the axial direction. With the present embodiment, twelve grooves 40*d* are formed at regular intervals along the circumferential direction. This suppresses irregularities in the rotation of the rotor. Returning to FIG. 2, description will be made.

The base 4 includes a cylindrical ring-shaped wall portion 4*e* with the rotational axis R as its center axis. The ring-shaped wall portion 4*e* is configured such that it protrudes upward so as to surround the shaft surrounding member 44. The laminated core 40 is fixedly bonded to the outer face 4*f* of the ring-shaped wall portion 4*e* by press fitting or otherwise by running fitting.

The shaft surrounding member 44 is surrounded by the ring-shaped wall portion 4*e*. The shaft surrounding member 44 is fit to a through hole 4*g* provided to the base 4 with the rotational axis R as its center axis. Specifically, the shaft surrounding member 44 is fixed to the through hole 4*g* by adhesion. A ring-shaped recess 66 is formed on the upper side of the shaft surrounding member 44 with the rotational axis R as its center axis. The recess 66 is configured such that it is recessed downward. A communicating hole 47 is formed in the shaft surrounding member 44 such that the upper side and the lower side communicate with each other.

The shaft surrounding member 44 includes a cylindrical inner member 45 which surrounds the shaft large-diameter portion 26*b*, and a cylindrical outer member 46 which surrounds the inner member 45. The inner member 45 and the outer member 46 are configured as separate members. The inner member 45 surrounds the shaft large-diameter portion 26*b* via a cylindrical radial gap 53. The outer face 45*a* of the inner member 45 is fixed to the inner face 46*a* of the outer member 46 by press fitting. The outer member 46 is fixed to the through hole 4*g* by adhesion. The recess 66 is formed as a space between the inner member 45 and the outer member 46.

A communicating groove 45*c* is formed in a straight-line form in the outer face 45*a* of the inner member 45. The communicating groove 45*c* is formed as a recessed portion that passes through the overall length of the inner member 45 along the axial direction. Thus, in a state in which the inner member 45 is fixed to the outer member 46, the communicating hole 47 is defined by the communicating groove 45*c* and the inner face 46*a* of the outer member 46. It should be noted that, instead of providing such a communicating groove to the outer face 45*a* of the inner member 45, such a communicating groove may be provided to the inner face 46a of the outer member 46. Such an arrangement also defines the communicating hole 47.

The lower portion 45f of the inner member 45 and the lower portion 46d of the outer member 46 form a fitting small-diameter portion 44a which is fitted and fixed to the through hole 4g. The upper portion 45g of the inner member 45 and the upper portion 46e of the outer member 46 form a surrounding large-diameter portion 44b which is surrounded by the first hub cylindrical portion 28f. With the outer member 46, the upper portion 46e has a larger diameter than that of the lower portion 46d. In other words, the upper portion 46e has a larger thickness along the radial direction than that of the lower portion 46d. Thus, the surrounding large-diameter portion 44b is configured to have a diameter that is larger than that of the fitting small-diameter portion 44a. The radial gap 72 between the surrounding large-diameter portion 44b and the first hub cylindrical portion 28f functions as a labyrinth with respect to the vapor of a lubricant agent 48 that evaporates from a gas-liquid interface 49. Such an arrangement prevents the lubricant agent 48 gas from reaching the magnetic recording disk 8.

The inner member 45 and the outer member 46 may each be formed of various kinds of metal materials or resin materials. The inner member 45 and the outer member 46 may be formed of the same material or otherwise different materials. For example, the inner member 45 and the outer member 46 may each be formed by cutting a brass base material in a desired form and by nickel plating the resulting member. In this case, the inner member 45 and the outer member 46 have the same linear expansion coefficient. This reduces the risk of the occurrence of a gap between the inner member 45 and the outer member 46 even at a high temperature or otherwise at a low temperature. That is to say, such an arrangement allows the normal-operation temperature range to be widened.

Figure 4:
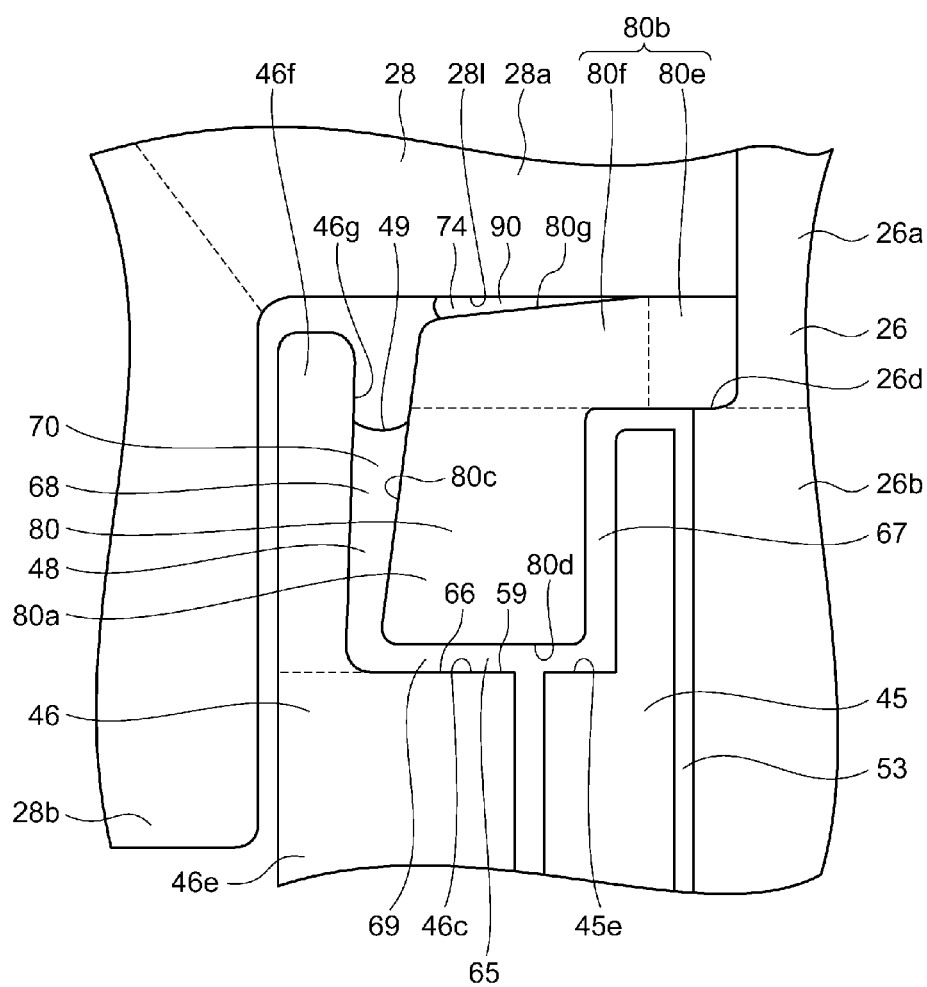
FIG. 4 is an enlarged cross-sectional view showing an enlargement of a portion around a circular member.

FIG. 4 is an enlarged cross-sectional view showing an enlargement of a portion around the circular member 80. The circular member 80 surrounds and is fixed to the lower end of the shaft small-diameter portion 26a. In this state, the circular member 80 is configured to be rotated together with the shaft 26 and the hub 28 in the form of a single unit. The circular member 80 has a reversed-L-shaped cross-section. The circular member 80 includes an insertion portion 80a which is to be inserted into the recess 66, and an extending portion 80b configured such that it extends inward in the radial direction from the upper end of the insertion portion 80a. The extending portion 80b includes a first extending portion 80e having a circular form, and a second extending portion 80f provided on the outer face side of the first extending portion 80e. The circular member 80 is fixed such that it is interposed between the hub 28 and the shaft large-diameter portion 26b. That is to say, the hub 28 presses the first extending portion 80e in contact with the upper face 26d of the shaft large-diameter portion 26b, thereby fixedly arranging the extending portion 80b. This ensures the precision of the circular member 80 mounting position with respect to the shaft 26. Furthermore, such an arrangement suppresses displacement of the circular member 80 with respect to the shaft 26.

The upper face 80g of the second extending portion 80f is configured as a sloping face with respect to the lower face 28l of the shaft fixation portion 28a. As the position becomes closer to the outer side in the radial direction, a gap 74 between the upper face 80g of the second extending portion 80f and the lower face 28l of the shaft fixation portion 28a becomes greater. The gap 74 functions as an adhesive agent reservoir which reserves the adhesive agent 90 in a step in which the hub 28 is fixed to the shaft 26 by means of a combination of adhesion and press fitting, which will be described later. The adhesive agent 90 thus reserved in the gap 74 also functions as a sealing material which prevents the lubricant agent 48 from leaking out. It should be noted that at least one of the upper face 80g or the lower face 28l may be provided with a recess which functions as an adhesive reservoir. Also, the upper face 80g may be provided with a protrusion which protrudes upward such that it surrounds the shaft small-diameter portion 26a. Such an arrangement prevents the adhesive agent 90 from reaching a tapered sealing portion 70.

After the insertion portion 80a is inserted into the recess 66, a gap is defined by the insertion portion 80a and the recess 66 where they face each other. Specifically, the gap thus defined includes an inner gap 67 defined by the insertion portion 80a and the recess 66 where they face each other in the radial direction, an outer gap 68, and an intermediate gap 69 defined by the insertion portion 80a and the recess 66 where they face each other in the axial direction. The outer gap 68 is positioned on the outer side in the radial direction with respect to the inner gap 67. The outer gap 68 has the gas-liquid interface 49.

The intermediate gap 69 includes an agitation portion 65 which generates pressure that directs the lubricant agent 48 toward the inner side in the radial direction when the insertion portion 80a is rotated with respect to the recess 66. A portion of the upper face 46c of the outer member 46 that corresponds to the agitation portion 65 is provided with a groove 59 having a spiral structure or a herringbone structure. Such a groove 59 may be formed in the upper face 45e of the inner member 45, instead of or in addition to providing the groove 59 to the upper face 46c of the outer member 46. Also, such a groove 59 may be formed in the lower face 80d of the insertion portion 80a, instead of or in addition to providing the groove 59 to the upper face 46c of the outer member 46. When the insertion portion 80a is rotated with respect to the recess 66, the groove 59 generates pressure that directs the lubricant agent 48 toward the inner side in the radial direction. The pressure thus generated prevents the lubricant agent 48 from leaking out.

The upper portion 46e of the outer member 46 includes a protrusion 46f arranged such that it faces the insertion portion 80a in the radial direction. The protrusion 46f surrounds the insertion portion 80a. The tapered sealing portion 70 is formed between the protrusion 46f and the insertion portion 80a such that it gradually extends as it approaches the upper side. Specifically, the inner face 46g of the protrusion 46f and the outer face 80c of the insertion portion 80a are each configured such that their diameters become smaller as they approach the upper side. Furthermore, the diameter of the inner face 46g of the protrusion 46f becomes smaller at a rate that is smaller than that with which the diameter of the outer face 80c of the insertion portion 80a becomes smaller. Thus, such an arrangement provides the tapered sealing portion 70 with a tapered shape. When the rotor is rotated, an outward force in the radial direction is applied to the lubricant agent 48 within the tapered sealing portion 70 due to centrifugal force. Because the protrusion 46f is configured such that the inner face 46g has a diameter that is smaller as it approaches the upper side, the force is applied to the lubricant agent 48 such that it is drawn downward. Furthermore, the tapered sealing portion 70 prevents the lubricant agent 48 from leaking out using the capillary action.

The insertion portion 80a and the extending portion 80b of the circular member 80 are formed in the form of a single unit. The circular member 80 may be formed of various kinds of metal materials or resin materials. For example, the circular member 80 may be formed by cutting a steel material such as SUS430 or the like having substantially the same linear expansion coefficient as that of the shaft 26. In this case, such an arrangement suppresses the occurrence of stress due to the difference in the linear expansion coefficient. In particular, such an arrangement suppresses the occurrence of cracks or plastic deformation in the circular member 80 or the shaft small-diameter portion 26a. As a steel material employed for the circular member 80, for example, a stainless steel material manufactured by Dido Steel Co., Ltd. under the trade name DHS1 is preferably employed because it involves a small amount of outgas and the machining is easy. It should be noted that, after the insertion portion 80a and the extending portion 80b are formed as separate units, the insertion portion 80a and the extending portion 80b may be coupled with each other. Returning to FIG. 2, description will be made.

The counter plate 54 is fixed to the lower face 46b of the outer member 46 by adhesion such that it covers the lower side of the shaft surrounding member 44. The upper face 54a of the counter plate 54, the lower face 45b of the inner member 45, and the inner face 46a of the outer member 46 define a flange space 60 which houses the flange 52. The upper face 52a of the flange 52 and the lower face 45b of the inner member 45 are arranged such that they face each other in the axial direction via a first thrust gap 57 having a circular form. Furthermore, the lower face 52b of the flange 52 and the counter plate 54 are arranged such that they face each other in the axial direction via a second thrust gap 58 having a circular form.

A gap defined by the shaft 26, the flange 52, and the circular member 80, which are configured as a part of the rotor, and the inner member 45, the outer member 46, and the counter plate 54, which are configured as a part of the stator, is filled with the lubricant agent 48. Furthermore, the communicating hole 47 is filled with the lubricant agent 48. The lubricant agent 48 contains a fluorescent material. When light such as ultraviolet light is irradiated to the lubricant agent 48, the lubricant agent 48 emits light having a wavelength that is different from the incident light, e.g., blue or green light, due to the interaction between the fluorescent material and the incident light. With such an arrangement in which the lubricant agent 48 includes such a fluorescent material, this allows the liquid surface of the lubricant agent 48 to be monitored in a simpler manner. Furthermore, such an arrangement allows the adhesion or leakage of the lubricant agent 48 to be detected in a simple manner.

The radial gap 53 includes two radial dynamic pressure generating portions 61 and 62 configured to apply radial dynamic pressure to the lubricant agent 48 in the radial direction when the shaft 26 is rotated with respect to the shaft surrounding member 44. The two radial dynamic pressure generating portions 61 and 62 are arranged as separate portions at a predetermined interval along the axial direction. Specifically, the first radial dynamic pressure generating portion 61 is arranged above the second radial dynamic pressure generating portion 62. With such an arrangement, a first radial dynamic pressure generating groove 50 and a second radial dynamic pressure generating groove 51, each having a spiral structure or a herringbone structure, are formed at the respective portions of the inner face 45d of the inner member 45 that correspond to the two radial dynamic pressure generating portions 61 and 62. It should be noted that at least one of the first radial dynamic pressure generating groove 50 and the second radial dynamic pressure generating groove 51 may be formed in the outer face 26f of the shaft large-diameter portion 26b of the shaft 26, instead of the inner face 45d of the inner member 45.

The first thrust gap 57 includes a first thrust dynamic pressure generating portion 63 configured to apply axial dynamic pressure to the lubricant agent 48 when the shaft 26 is rotated with respect to the shaft surrounding member 44. With such an arrangement, a first thrust dynamic pressure generating groove 55 having a spiral structure or a herringbone structure is formed at a portion of the upper face 52a of the flange 52 that corresponds to the first thrust dynamic pressure generating portion 63. Also, the first thrust dynamic pressure generating groove 55 may be formed in the lower face 45b of the inner member 45, instead of the upper face 52a of the flange 52.

The second thrust gap 58 includes a second thrust dynamic pressure generating portion 64 configured to apply axial dynamic pressure to the lubricant agent 48 when the shaft 26 is rotated with respect to the shaft surrounding member 44. With such an arrangement, a second thrust dynamic pressure generating groove 56 having a spiral structure or a herringbone structure is formed at a portion of the lower face 52b of the flange 52 that corresponds to the second thrust dynamic pressure generating portion 64. Also, the second thrust dynamic pressure generating groove 56 may be formed in the upper face 54a of the counter plate 54, instead of the lower face 52b of the flange 52.

When the rotor is rotated relative to the stator, dynamic pressure is applied to the lubricant agent 48 by means of the first radial dynamic pressure generating groove 50, the second radial dynamic pressure generating groove 51, the first thrust dynamic pressure generating groove 55, and the second thrust dynamic pressure generating groove 56. By applying such dynamic pressure thus generated, the rotor is supported in a contactless manner both radially and axially. There is a position relation between the first radial dynamic pressure generating portion 61 and the tapered sealing portion 70. That is to say, the first radial dynamic pressure generating portion 61 and the tapered sealing portion 70 at least partially overlap each other in the axial direction.

With regard to the path of the lubricant agent 48, the upper end of the radial gap 53 defined by the shaft 26 and the inner member 45 communicates with the inner gap 67. Furthermore, the lower end of the radial gap 53 communicates with the flange space 60. The inner gap 67 communicates with the flange space 60 via the communicating hole 47. Thus, both ends of the radial gap 53 configured along the axial direction also communicate with each other via the communicating hole 47 which is configured separately from the radial gap 53.

Figure 5:
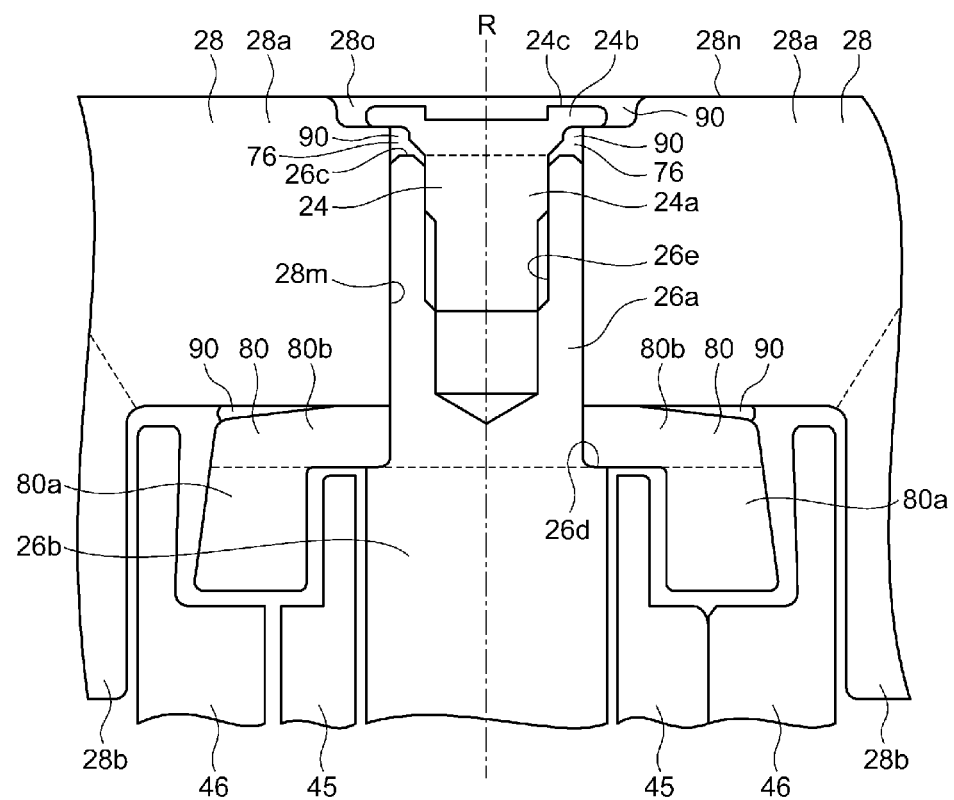
FIG. 5 is an enlarged cross-sectional view showing an enlargement of a portion around a shaft small-diameter portion.

Next, description will be made regarding a method for fixing the hub 28 to the shaft 26. FIG. 5 is an enlarged cross-sectional view showing an enlargement of a portion around the shaft small-diameter portion 26a. The shaft fixation portion 28a of the hub 28 is provided with a shaft hole 28m with the rotational axis R as its center axis. The upper portion of the shaft small-diameter portion 26a is inserted into the shaft hole 28m, and is fixed by means of press fitting and adhesion. Furthermore, the hub 28 is fixed to the shaft 26 by means of the hub fixation screw 24. The hub fixation screw 24 includes a small-diameter portion 24a to be fit to the hub fixation screw hole 26e, and a large-size portion 24b having a size that is larger than that of the small-diameter portion 24a. After the hub fixation screw 24 is screwed into the hub fixation screw hole 26e, the edge of the shaft hole 28m of the hub 28 and the extending portion 80b of the circular member 80 are interposed between the large-size portion 24b of the hub fixation screw 24 and the upper face 26d of the shaft large-diameter portion 26b. That is to say, the hub 28 is fixed between the hub fixation screw 24 and the shaft 26 via the circular member 80. As described above, in addition to adhesion and press fitting, the hub 28 and the shaft 26 are fixed by means of the hub fixation screw 24, and thus they are coupled with sufficient strength.

The upper face 28n of the shaft fixation portion 28a is provided with a hub recessed portion 28o configured such that it is recessed downward. The large-size portion 24b is housed in the hub recessed portion 28o in a state in which the hub 28 is fixed to the shaft 26 after the hub fixation screw 24 has been screwed into the hub fixation screw hole 26e. Specifically, the large-size portion 24b is housed in the hub recessed portion 28o such that its upper face 24c does not protrude upward from the upper face 28n of the shaft fixation portion 28a.

In order to prevent the detachment of the hub fixation screw 24, at least one of the gap between the hub fixation screw 24 and the hub fixation screw hole 26e and the axial gap between the large-size portion 24b and the shaft small-diameter portion 26a (circumferential space 76) may be filled with the adhesive agent 90. For example, in a case in which both gaps are filled with the adhesive agent 90, a suitable amount of the adhesive agent 90 may be applied to the circumferential face of the hub fixation screw hole 26e and the upper face 26c of the shaft small-diameter portion 26a before the hub fixation screw 24 is screwed in, thereby filling both gaps with the adhesive agent 90. Also, the hub recessed portion 28o may be filled with the adhesive agent 90. In this case, the adhesive agent is applied to the hub recessed portion 28o before or otherwise after the hub fixation screw 24 is screwed in, thereby filling the hub recessed portion 28o with the adhesive agent 90. It should be noted that FIG. 5 shows a case in which all the gaps and the hub recessed portion 28o are filled with the adhesive agent 90.

The hub fixation screw 24 may be formed of various kinds of metal materials. For example, the hub fixation screw 24 may be formed by cutting or rolling a steel material such as SUS410 or the like having substantially the same linear expansion coefficient as that of the shaft 26. In this case, such an arrangement suppresses the occurrence of stress due to the difference in the linear expansion coefficient. In particular, such an arrangement suppresses the occurrence of cracks or plastic deformation in the hub fixation screw 24 or the shaft small-diameter portion 26a. Returning to FIG. 2, description will be made.

In a case in which the four magnetic recording disks 8 are mounted on the hub 28, the center of gravity G of the rotor is positioned between the two radial dynamic pressure generating portions 61 and 62 in the axial direction, i.e., is positioned within the bearing span. Typically, as the number of magnetic recording disks 8 mounted on the hub 28 becomes greater, the position of the center of gravity G of the rotor mounting the magnetic recording disks 8 becomes higher (i.e., the center of gravity G shifts upward), and in some cases, the center of gravity G is positioned outside the bearing span. With the present embodiment, mainly by means of the two configurations described below, such an arrangement allows the center of gravity G to be positioned within the bearing span even if the number of magnetic recording disks 8 mounted on the hub 28 is four or more.

Configuration 1: The first radial dynamic pressure generating portion 61 at least partially overlaps the tapered sealing portion 70 in the axial direction. This allows the distance in the axial direction between the first radial dynamic pressure generating portion 61 and the second radial dynamic pressure generating portion 62, i.e., the bearing span, to be increased to that extent without being limited by the length of the tapered sealing portion. That is to say, with the configuration 1, the increased bearing span allows the center of gravity G to be within the bearing span.

Configuration 2: The hub 28 is fixed to the shaft 26 by means of the hub fixation screw 24, in addition to adhesion and press fitting. This allows the hub 28 and the shaft 26 to be connected with each other with sufficient strength without a need to increase the length of the connection portion that connects the hub 28 and the shaft 26 along the axial direction. This allows the shaft fixation portion 28a to be configured to have a relatively small thickness in the axial direction, thereby configuring the upper side of the hub 28 to have a light weight. This provides an advantage of lowering the position of the center of gravity G of the rotor. Furthermore, such a reduction in the thickness of the shaft fixation portion 28a in the axial direction allows the bearing span to be increased. That is to say, the configuration 2 allows the bearing span to be increased while maintaining the center of gravity G at a relatively low level, thereby allowing the center of gravity G to be positioned within the bearing span.

Description will be made regarding the operation of the rotating device 100 thus configured as described above. In order to rotationally drive the magnetic recording disks 8, a three-phase driving current is supplied to the coil 42. When the driving current flows through the coil 42, a magnetic flux occurs along each of the twelve salient poles. The magnetic flux thus generated provides a torque to the cylindrical magnet 32, thereby rotationally driving the hub 28 and the magnetic recording disks 8 fitted to the hub 28. At the same time, the swing arm 14 is swung by means of the voice coil motor 16, so as to swing back and forth the record and playback head in the swinging range above the magnetic recording disks 8. The record and playback head is configured to convert magnetic data recorded on the magnetic recording disks 8 into an electrical signal, and to transmit the electric signal thus converted to a control board (not shown). Furthermore, the record and playback head receives data transmitted in the form of an electric signal from the control board, and writes the data thus received on the magnetic recording disk 8 in the form of magnetic data.

With the rotating device 100 according to the present embodiment, the hub 28 is fixed to the shaft 26 by means of the hub fixation screw 24, in addition to a combination of adhesion and press fitting. This allows the hub 28 to be fixed to the shaft 26 with sufficiently high strength even if the connection that connects them is configured to have a relatively small length in the axial direction. Thus, this allows multiple magnetic recording disks 8 to be mounted while maintaining an excellent balance state. That is to say, such an arrangement provides a rotating device with a hub having an excellent balance state during rotation even while having a large data capacity.

Furthermore, with the rotating device 100 according to the present embodiment, such an arrangement allows multiple magnetic recording disks 8 to be mounted while maintaining the position of the center of gravity G of the rotor within the bearing span. Thus, such an arrangement provides a rotating device having an improved balance level during rotation even while having a large data capacity.

Moreover, with the rotating device 100 according to the present embodiment, both ends of the radial gap 53 communicate with each other via the communicating hole 47 configured as a communicating portion which is different from the radial gap 53. This averages the pressures of the lubricant agent 48 at both ends of the radial gap 53, thereby preventing the occurrence of a large difference in the pressure. As a result, such an arrangement allows the radial dynamic pressure to be increased during rotation without being limited by the occurrence of a pressure difference, thereby providing the bearing with improved rigidity.

[Size]

The rotating device 100 according to the embodiment may preferably be employed in a so-called 3.5-inch disk drive apparatus, for example. Examples of the sizes of each gap along the radial direction for such a 3.5-inch disk drive apparatus are listed below.

Inner gap 67: 0.1 mm to 0.2 mm
Outer gap 68: 0.2 mm
Intermediate gap 69: 0.1 mm
Radial gap 53: 3.0 to 4.5 μm
Thrust gaps 57 and 58: 20 μm (sum total of the thrust gap sizes)
Gap between the flange 52 and the outer member 46: 0.1 mm or more.

Description has been made regarding the configurations and the operations of the rotating devices according to the embodiments. The above-described embodiments have been described for exemplary purposes only, and are by no means intended to be interpreted restrictively. Rather, it can be readily conceived by those skilled in this art that various modifications may be made by making various combinations of the aforementioned components, which are also encompassed in the technical scope of the present invention.

[Modification 1]

Figure 6:
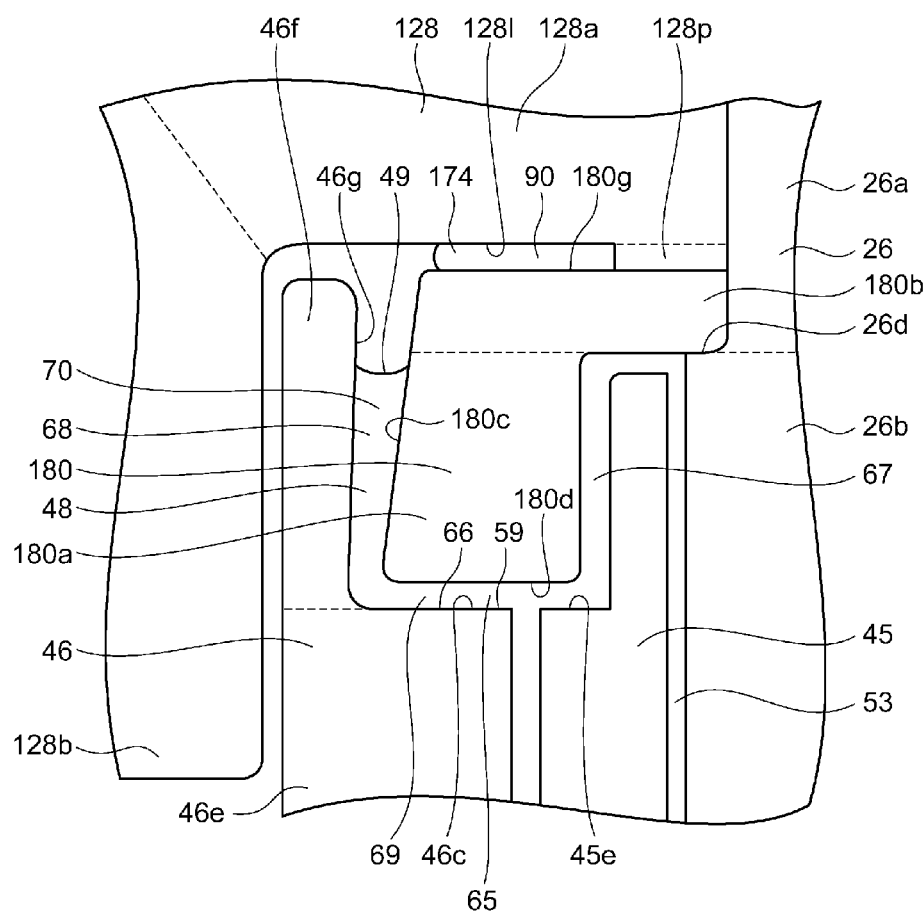
FIG. 6 is an enlarged cross-sectional view showing an enlargement of a portion around the circular member of the rotating device according to a modification.

FIG. 6 is an enlarged cross-sectional view showing an enlargement of a portion around a circular member 180 of a rotating device 200 according to a modification. FIG. 6 corresponds to FIG. 4. The major difference between the rotating device 100 according to the embodiment and the rotating device 200 according to the modification is in the structures of the hub and the circular member.

The circular member 180 includes an insertion portion 180*a* and an extending portion 180*b*. The insertion portion 180*a* and the extending portion 180*b* correspond to the insertion portion 80*a* and the extending portion 80*b*, respectively. The extending portion 180*b* has an upper face 180*g* which is approximately in parallel with a lower face 128*l* of a shaft fixation portion 128*a*. On the lower face 128*l* of the shaft fixation portion 128*a* of the hub 128, a protrusion 128*p* is formed at a portion that faces the extending portion 180*b* and the upper face 26*d* in the axial direction such that it surrounds the shaft small-diameter portion 26*a*. In the same way as with the circular member 80, the circular member 180 is fixedly arranged in a state in which it is interposed between the hub 128 and the shaft large-diameter portion 26*b*. In this state, the upper face 180*g* of the extending portion 180*b* of the circular member 180 is pressed in contact with the protrusion 128*p*. This secures the precision of the mounting position of the circular member 180 with respect to the shaft 26. Furthermore, this suppresses displacement of the circular member 180 with respect to the shaft 26. A gap 174 is formed between the lower face 128*l* of the shaft fixation portion 128*a* and the upper face 180*g* of the extending portion 180*b* according to the thickness of the protrusion 128*p* in the axial direction. As with the gap 74, the gap 174 functions as an adhesive agent reservoir which reserves the adhesive agent 90. The adhesive agent 90 reserved in the gap 174 also functions as a sealing member which prevents the lubricant agent 48 from leaking out. The rotating device 200 according to the present modification provides the same effects and advantages as those provided by the rotating device 100 according to the present embodiment.

[Modification 2]

Description has been made in the embodiment regarding a so-called outer rotor type rotating device having a configuration in which the cylindrical magnet is arranged on the outer side of the laminated core. However, the present invention is not restricted to such an arrangement. For example, the technical idea of the present invention may be applied to a so-called inner rotor type rotating device having a configuration in which a cylindrical magnet is arranged on the inner side of the laminated core.

[Modification 3]

Description has been made in the embodiment regarding an arrangement in which the shaft surrounding member is directly mounted on the base. However, the present invention is not restricted to such an arrangement. For example, a brushless motor comprising a rotor and a stator may be formed separately. Also, an arrangement may be made in which the brushless motor thus formed is mounted on a chassis.

[Modification 4]

Description has been made in the embodiment regarding an arrangement employing a laminated core. However, the core thus employed is not restricted to such a laminated core. Description has been made in the embodiment regarding an arrangement in which the laminated core 40 includes twelve salient poles. However, the present invention is not restricted to such an arrangement. The number of salient poles of the laminated core 40 may be six or nine. Such an arrangement allows the coil 42 to be formed in a simpler manner. Also, the number of salient poles of the laminated core 40 may be a multiple of 3 ranging between 15 and 36. Such an arrangement provides the coil 42 with an increased number of turns.

[Modification 5]

Description has been made in the embodiment regarding an arrangement in which the laminated core is formed by laminating eighteen thin magnetic steel sheets each having a thickness of 0.35 mm, for example. However, the present invention is not restricted to such an arrangement. Also, the laminated core may be formed by laminating 2 to 32 thin magnetic steel sheets each having a thickness ranging between 0.1 mm and 0.8 mm, for example.

[Modification 6]

Description has been made in the embodiment regarding an arrangement in which the cylindrical magnet 32 is configured such that 8 driving magnetic poles are formed. However, the present invention is not restricted to such an arrangement. Also, the number of driving magnetic poles formed on the cylindrical magnet 32 may be an even number ranging between 10 and 16. This allows the magnetic poles to be formed in a simpler manner. Also, the number of driving magnetic poles formed on the cylindrical magnet 32 may be an even number ranging between 18 and 24. In this case, the number of salient poles of the laminated core 40 may be increased, thereby allowing the number of turns of the coil 42 to be increased. Description has been made above for exemplary purposes only. That is to say, the number of driving magnetic poles is not restricted to such a range.

[Modification 7]

The base 4 may be configured by making a combination of a base portion formed by pressing a metal plate such as an aluminum plate, an iron plate, or the like, and a die-cast portion formed of aluminum by die casting. For example, the bottom portion 4*a* may be configured including such a plate portion. Also, the outer wall portion 4*b* may be configured including such a die-cast portion. Such a configuration suppresses degradation of the rigidity of the screw hole 22. Examples of a method for manufacturing such a base 4 include a method whereby the die-cast portion is formed by means of aluminum die casting in a state in which such a plate portion formed beforehand is mounted on an aluminum die-cast base. Such a manufacturing method allows the bonding between the plate portion and the die-cast portion to be formed in a simpler manner. Furthermore, such a method allows the plate portion and the die-cast portion to have an improved size precision. Also, such a method allows an additional member for connecting the plate portion and the die-cast portion to be configured with a reduced size. Alternatively, such a method allows the plate portion and the die-cast portion to be connected without such an additional member. As a result, such an arrangement allows the base 4 to be configured to have a small thickness.

[Modification 8]

Description has been made in the embodiment regarding an arrangement in which the hub 28 is fixed to the shaft 26 by coupling the hub fixation screw 24 with the hub fixation screw hole 26e. That is to say, description has been made regarding an arrangement in which the hub fixation screw 24 is employed as a fastener. However, the present invention is not restricted to such an arrangement. As such a fastener, known coupling mechanisms may be employed, examples of which include swaging pins, eyelets, rivets, etc.

What is claimed is:

1. A rotating device comprising:
   a hub on which a magnetic recording disk is to be mounted;
   a shaft configured to extend along a rotational axis of the hub;
   a shaft surrounding member configured to surround one end side of the shaft, and configured to rotatably support the shaft; and
   a base configured to fixedly support the shaft surrounding member,
   wherein a lubricant agent is interposed between the shaft and the shaft surrounding member,
   and wherein a gap between the shaft and the shaft surrounding member comprises a radial dynamic pressure generating portion configured to generate a dynamic pressure applied to the lubricant agent in a radial direction when the shaft is rotated with respect to the shaft surrounding member,
   and wherein a fastener hole is provided to the other end face of the shaft along the rotational axis,
   and wherein the hub is fixed to the shaft by coupling a fastener with the fastener hole.

2. The rotating device according to claim 1, wherein the hub comprises a shaft hole configured as a through hole that passes through the hub along the rotational axis,
   and wherein the shaft comprises:
      a shaft small-diameter portion to be fit into the shaft hole; and
      a shaft large-diameter portion having a larger diameter than that of the shaft small-diameter portion,
   and wherein the fastener hole is provided to said other end face of the shaft small-diameter portion along the rotational axis,
   and wherein the fastener comprises:
      a fastener small-diameter portion to be fit into the fastener hole; and
      a fastener large-size portion having a larger size than that of the fastener small-diameter portion,
   and wherein the hub is fixed to the shaft such that an edge of the shaft hole is interposed between the fastener large-size portion and the shaft large-diameter portion.

3. The rotating device according to claim 2, wherein a hub recessed portion is provided to the hub, configured such that it is recessed in an axial direction, and configured to house the fastener large-size portion.

4. The rotating device according to claim 2, wherein a circumferential space is provided in an axial gap defined between the fastener large-size portion and the shaft small-diameter portion, and an adhesive agent is interposed in the circumferential space.

5. The rotating device according to claim 1, further comprising a circular member configured to be integrally rotated with the hub;
   wherein a circular recessed portion is formed in a hub side end face of the shaft surrounding member,
   and wherein the circular member comprises an protruding portion to be introduced into the recessed portion,
   and wherein, of two gaps defined by the insertion portion and the recessed portion where they face each other in the radial direction, a gap on an outer side along the radial direction is formed such that, as the distance between the gap and said one end of the shaft becomes greater, the width of the gap becomes greater,
   and wherein a gas-liquid interface of the lubricant agent is formed in the gap on the outer side.

6. The rotating device according to claim 5, wherein the circular member comprises an extending portion extending inward in the radial direction, having a part interposed between the hub and the shaft in an axial direction.

7. The rotating device according to claim 5, wherein at least one part of the protruding portion and the recessed portion facing each other in an axial direction comprises a pressure generating groove.

8. The rotating device according to claim 5, wherein the hub comprises a protrusion abutting to the circular member in an axial direction.

9. The rotating device according to claim 5, wherein the shaft surrounding member comprises:
   an inner member configured to surround the shaft; and
   an outer member configured as a separate member from the inner member, and configured to surround the inner member,
   and wherein the recessed portion is formed between the inner member and the outer member.

10. The rotating device according to claim 1, wherein a hole is provided to the base,
    and wherein the shaft surrounding member comprises:
       a fitting small-diameter portion configured to be fit into the hole, and to be fixed to the base; and
       a surrounding large-diameter portion having a diameter that is larger than that of the fitting small-diameter portion, and configured to be surrounded by a hub cylindrical portion provided to the hub,
    and wherein a labyrinth is provided in a radial gap defined between the surrounding large-diameter portion and the hub cylindrical portion.

11. A rotating device comprising:
    a rotor comprising a hub on which a magnetic recording disk is to be mounted, and a shaft configured to extend along a rotational axis of the hub; and
    a stator comprising a shaft surrounding member configured to surround one end side of the shaft, and configured to rotatably support the shaft, and a base configured to fixedly support the shaft surrounding member,
    wherein a gap between the shaft and the shaft surrounding member comprises a radial dynamic pressure generating portion,
    and wherein a fastener hole is provided to the other end face of the shaft along the rotational axis,
    and wherein the hub is fixed to the shaft by coupling a fastener with the fastener hole,
    and wherein a tapered sealing portion is provided to a gap between the rotor and the stator, and wherein the rotor and the stator are configured such that the radial dynamic pressure generating portion and the tapered sealing portion at least partially overlap each other in an axial direction, and such that the center of gravity of the rotor is positioned within a range of the radial dynamic pressure generating portion in the axial direction when a plurality of magnetic recording disks are mounted on the rotor.

12. The rotating device according to claim 11, further comprising a circular member configured to be integrally rotated with the hub;

wherein a circular recessed portion is formed in a hub side end face of the shaft surrounding member, and wherein the circular member comprises an protruding portion to be introduced into the recessed portion, and wherein, of two gaps defined by the insertion portion and the recessed portion where they face each other in a radial direction, a gap on an outer side along the radial direction is formed such that, as the distance between the gap and said one end of the shaft becomes greater, the width of the gap becomes greater, and wherein a gas-liquid interface of the lubricant agent is formed in the gap on the outer side.

13. The rotating device according to claim 12, wherein the circular member comprises an extending portion extending inward in the radial direction, having a part interposed between the hub and the shaft in the axial direction.

14. The rotating device according to claim 12, wherein at least one part of the protruding portion and the recessed portion facing each other in the axial direction comprises a pressure generating groove.

15. The rotating device according to claim 12, wherein the hub comprises a protrusion abutting to the circular member in an axial direction.

16. A rotating device comprising:
a hub on which a magnetic recording disk is to be mounted;
a shaft configured to extend along a rotational axis of the hub;
a shaft surrounding member configured to surround one end side of the shaft, and to rotatably support the shaft; and
a base configured to fixedly support the shaft surrounding member,
wherein a gap between the shaft and the shaft surrounding member comprises a radial dynamic pressure generating portion,
and wherein a fastener hole is provided to the other end face of the shaft along the rotational axis,
and wherein the hub is fixed to the shaft by coupling a fastener with the fastener hole,
and wherein a hole is provided to the base,
and wherein the shaft surrounding member comprises:
a fitting small-diameter portion configured to be fit into the hole, and to be fixed to the base; and
a surrounding large-diameter portion having a diameter that is larger than that of the fitting small-diameter portion, and configured to be surrounded by a hub cylindrical portion provided to the hub,
and wherein a labyrinth is provided in a radial gap defined between the surrounding large-diameter portion and the hub cylindrical portion.

17. The rotating device according to claim 16, further comprising a circular member configured to be integrally rotated with the hub;

wherein a circular recessed portion is formed in a hub side end face of the shaft surrounding member, and wherein the circular member comprises an protruding portion to be introduced into the recessed portion, and wherein, of two gaps defined by the insertion portion and the recessed portion where they face each other in the radial direction, a gap on an outer side along the radial direction is formed such that, as the distance between the gap and said one end of the shaft becomes greater, the width of the gap becomes greater, and wherein the gap on the outer side is configured to form the capillary seal for the lubricant agent.

18. The rotating device according to claim 17, wherein the circular member comprises an extending portion extending inward in the radial direction, having a part interposed between the hub and the shaft in an axial direction.

19. The rotating device according to claim 17, wherein at least one part of the protruding portion and the recessed portion facing each other in an axial direction comprises a pressure generating groove.

20. The rotating device according to claim 17, wherein the hub comprises a protrusion abutting to the circular member in an axial direction.

* * * * *